Jan. 31, 1939. C. W. TOWNSEND 2,145,500
PAMPHLET AND ENVELOPE INCORPORATED THEREIN
Filed April 19, 1935 4 Sheets-Sheet 1
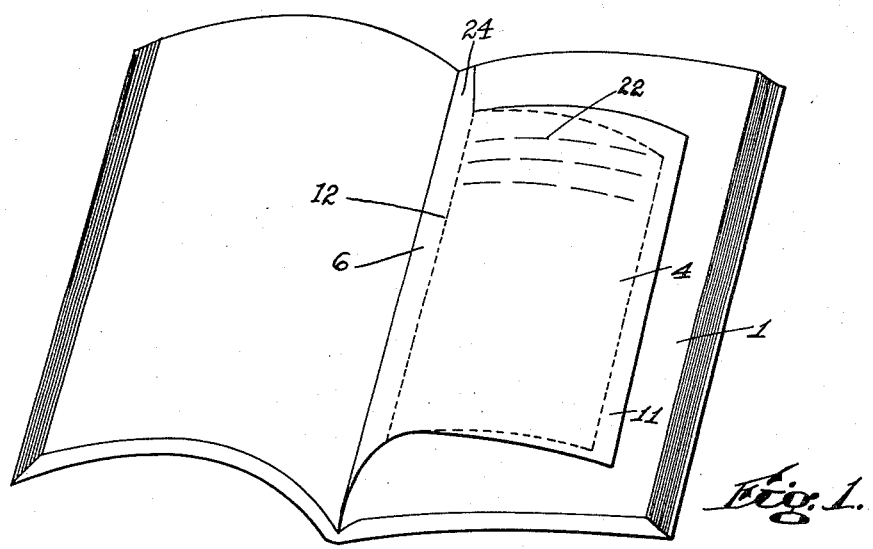
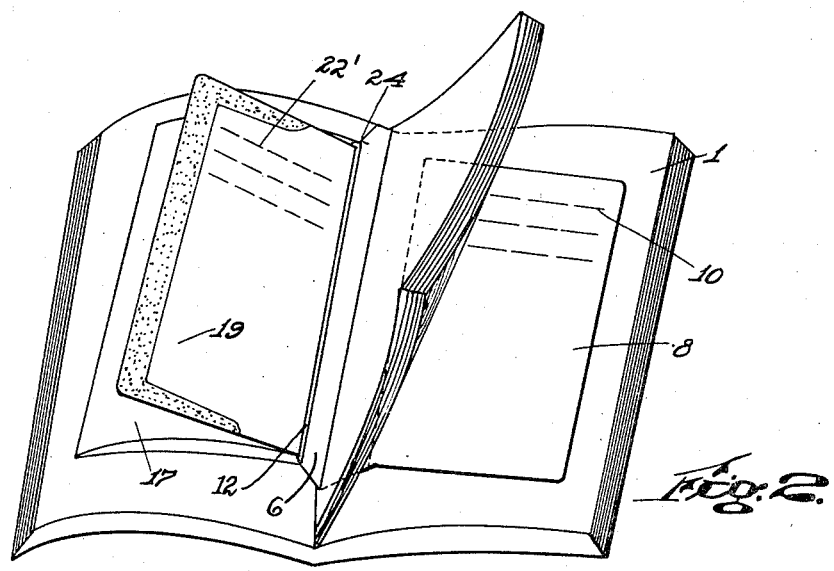
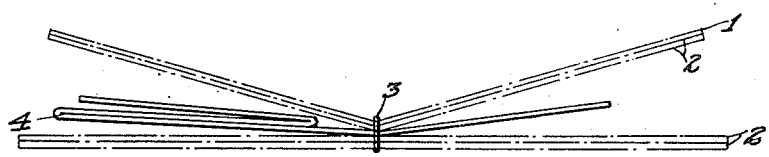
Inventor:
Charles W. Townsend
By Geo. H. Kennedy Jr.
Attorney

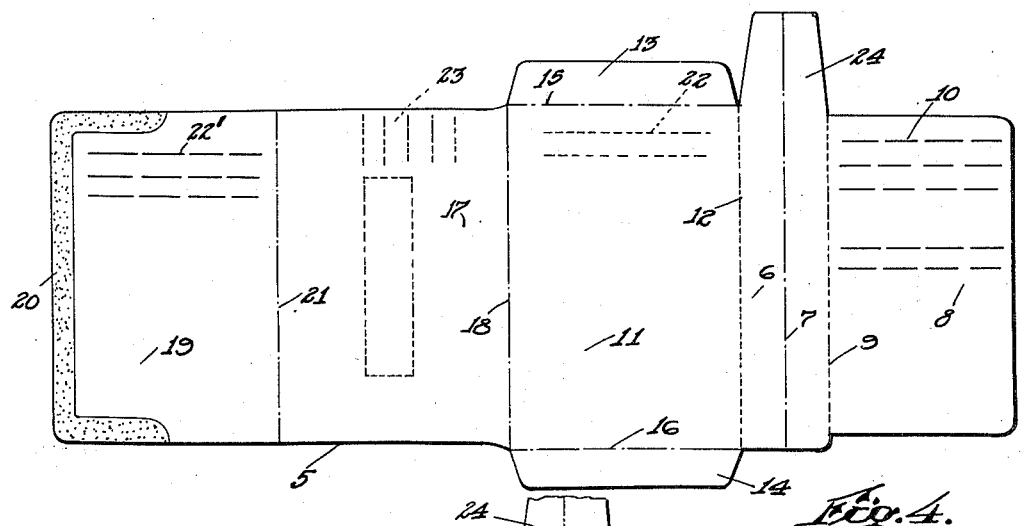
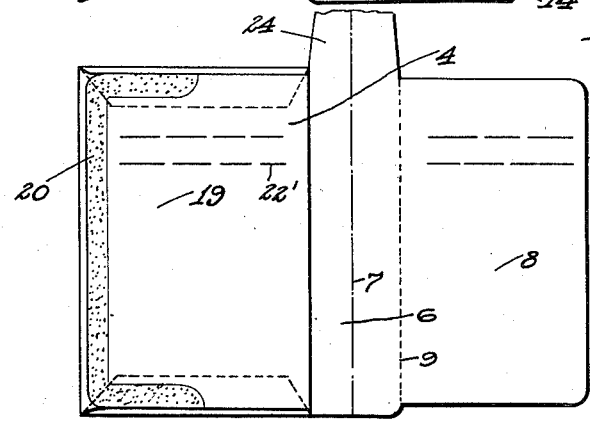
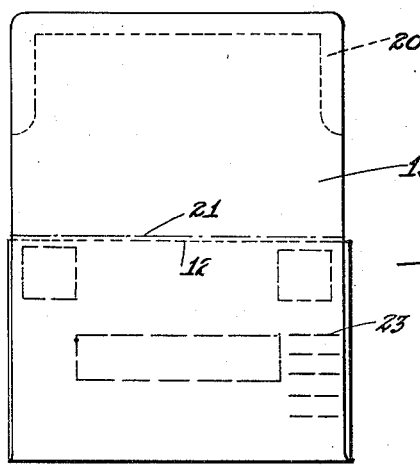

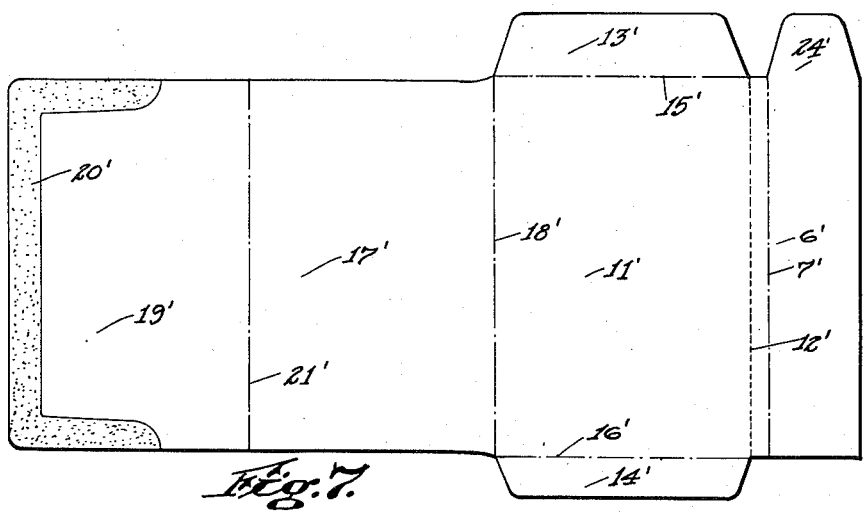
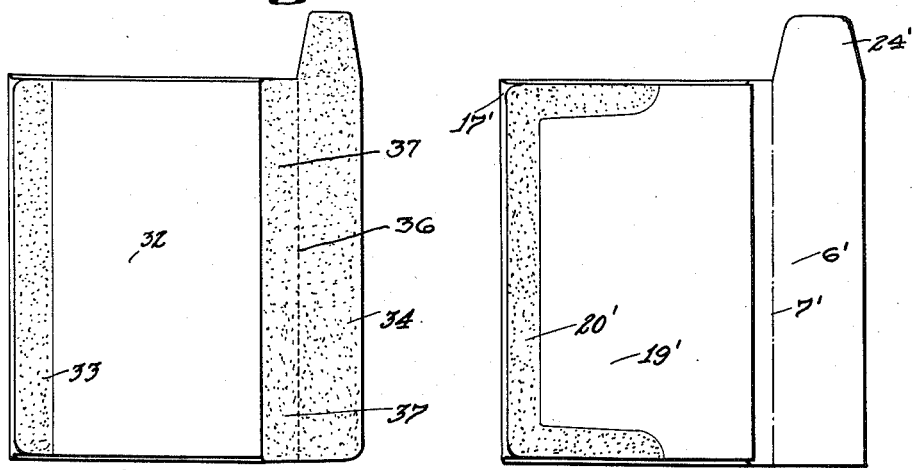
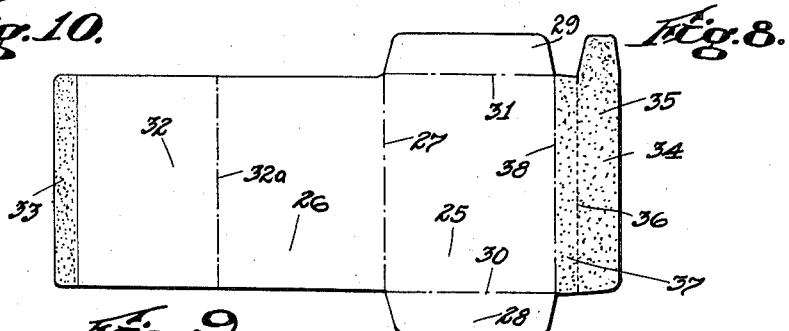

Jan. 31, 1939. C. W. TOWNSEND 2,145,500
PAMPHLET AND ENVELOPE INCORPORATED THEREIN
Filed April 19, 1935 4 Sheets-Sheet 4

Inventor:
Charles W. Townsend
By Wm. H. Kennedy
Attorney

Patented Jan. 31, 1939

2,145,500

UNITED STATES PATENT OFFICE 2,145,500

PAMPHLET AND ENVELOPE INCORPORATED THEREIN

Charles W. Townsend, Worcester, Mass., assignor to United States Envelope Company, Springfield, Mass., a corporation of Maine Application April 19, 1935, Serial No. 17,308

5 Claims. (Cl. 281—3)

The present invention relates to an envelope which is intended to form one leaf of a pamphlet or magazine such as the usual periodical, such envelope, for example, being used by the subscriber or purchaser in mailing his subscription, or the subscription of others, to the publisher, or in corresponding relative to the subject matter printed on the envelope.

As an advertising device for obtaining renewal and new subscriptions, order blanks have been placed between two of the leaves of the periodical, being, in some cases, adhesively fastened therein. Where the blank is merely placed between two of the leaves without being fastened therein, it is readily misplaced and its value as an advertising device is relatively small. If the subscription blank is adhesively secured within the periodical, it is impossible to remove such a blank without detracting from the appearance of the periodical, or frequently tearing the blank, or the periodical. Moreover, the subscriber finds it necessary to obtain an envelope from an outside source in which to enclose the subscription.

To avoid some of the above noted objections, business reply postcards which require no postage, or subscription blanks, are fastened into the periodical by the same fasteners which hold the sheets of the periodical together. In this arrangement, however, the blank or card is difficult to remove without injury to the periodical, or without tearing the blank or card. Even with this arrangement, an envelope must be obtained from an outside source, if the subscriber wishes to forward the blank, as well as other material such as checks or money orders.

One of the principal objects of the present invention is accordingly to avoid the objections inherent in the above noted devices, by providing a complete envelope which may be bound into a periodical or pamphlet by the same fasteners that hold the pamphlet together, said envelope forming one of the leaves of the pamphlet. The envelope of the invention preferably has a projecting tab which is separable from the envelope along a tearing line, said tab providing for the attachment of the envelope to the pamphlet. By this arrangement, a complete envelope which may be the well known business reply envelope, requiring no postage, may be incorporated in a pamphlet so that a subscriber has at hand a complete envelope in which subscription blanks or subscription payments may be enclosed. At the same time a complete envelope held in a pamphlet in accordance with the invention will not become lost from the pamphlet, but is readily removed therefrom when desired.

A further object of the invention is to provide a pamphlet which incorporates therein a complete envelope, which is removable from the pamphlet without injury to the envelope or pamphlet, and which does not require any forming operation before the envelope is completed and ready for use. The pamphlet may also incorporate, integral with the complete envelope but separable therefrom for enclosure within the envelope, a blank which may be removed from the pamphlet, either together with or separately from the envelope, to form an inclosure for the envelope.

Other and further objects and advantages of the invention will more fully appear from the following detailed description taken in connection with the accompanying drawings, in which—

Fig. 1 is a perspective view of a pamphlet showing a complete envelope incorporated therein in accordance with the invention.

Fig. 2 is a perspective view similar to Fig. 1, showing the remainder of the envelope structure as mounted in the pamphlet.

Fig. 3 is an end view through the pamphlet, the thickness of the leaves and envelope being greatly exaggerated.

Fig. 4 is a plan view of the blank from which the envelope structure is formed.

Fig. 5 is a plan view of the envelope structure in readiness for positioning within the pamphlet.

Fig. 6 is a plan view of the complete envelope when removed from the pamphlet.

Fig. 7 is a view corresponding to Fig. 4, showing a modification.

Fig. 8 is a plan view of an envelope structure formed from the blank of Fig. 7, in readiness for insertion in a pamphlet.

Fig. 9 is a plan view of a blank showing another modification.

Fig. 10 is a completed envelope structure formed from the blank of Fig. 9.

Like reference characters refer to like parts in the different figures.

Figure 11:
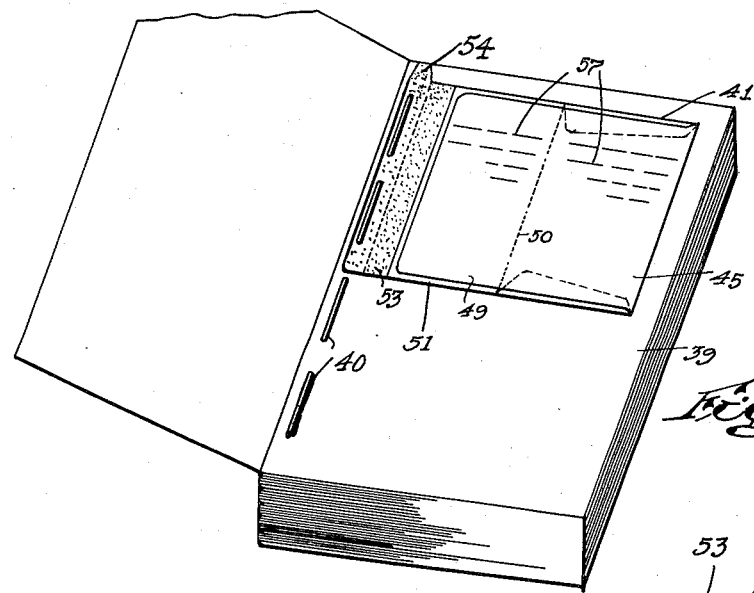
Fig. 11 is a perspective view of a modified form of the invention, the pamphlet in this view being of the flat type.

Referring first to Figs. 1 to 3 inclusive, the pamphlet 1 is shown as being of the well known saddle-back type in which the several sheets 2 thereof are secured together by clips 3 extending centrally through the entire group of sheets. The clips 3 which secure the sheets 2 also secure a complete envelope structure 4 within the pamphlet, with the structure 4 forming one of the sheets of the pamphlet. The structure 4 embodies a complete envelope which is separable from the portion of the structure which is secured within the pamphlet, as will hereinafter appear, Fig. 3 being greatly exaggerated by showing the sheets of the pamphlet as being of a substantial thickness, in order that the manner of attachment of the envelope structure may be readily apparent.

Referring now to Fig. 4, the blank 5 from which the envelope structure is formed has a narrow strip 6, which is provided centrally with a score line 7 along which the strip is folded. A large rectangular flap 8, integral with the strip 6 along one edge thereof, is separable from said strip along a line of perforations 9, the latter providing for the removal of said flap to form an enclosure for the envelope. This flap may carry advertising or other printed matter, represented by the dot-dash lines 10, and preferably so arranged that when the completed envelope structure is bound within the pamphlet, the printing will extend at right angles to the binding, to permit the reading of said printed matter when the pamphlet is held in the normal position.

A rectangular portion 11, which forms the rear wall of the complete envelope, is integral with the strip 6, extending from the edge of said strip opposite to the flap 8, the line of separation between the strip 6 and said portion 11 being defined by a row of perforations 12 along which the complete envelope may be separated from the strip, as will hereinafter appear. The opposite side edges of the portion 11 provide side flaps 13 and 14 foldable over against the portion 11 along the dot-dash lines 15 and 16, respectively, in forming the complete envelope, the blank being scored along the lines 15 and 16 for accurate folding of the flaps, if desired.

A rectangular portion 17 of the blank which forms the front wall of the envelope is integral with the portion 11 and extends from the edge thereof opposite to the strip 6, the line of fold between said portions being represented by a dot-dash line 18 which may be a score line for accurate folding. A sealing flap 19 extending beyond the front wall portion 17 has adhesive 20 applied to its free edges on one side thereof, the scored fold line between the front wall portion 17 and the sealing flap 19 being represented by a dot-dash line 21. The sealing flap 19 and front wall portion 17 are substantially equal in area, so that the sealing flap may cover substantially all of the rear wall of the complete envelope when the latter is sealed, and the rear wall portion 11 is slightly less wide than the front wall portion 17 to allow the sealing flap to be folded over the free edge of said portion 11 in closing the envelope. The length and width of the flap 8 are obviously slightly less than the length and width of the complete envelope so that said flap, when separated from the strip 6, may be inserted within the envelope.

Printing, such as advertising matter, may be located on the under side of the rear wall portion 11, as indicated at 22, since the sealing flap 19 is substantially equal in size to said rear wall portion and will accordingly cover the printing thereon when the envelope is sealed. The underside of the portion 17 forming the front wall may incorporate thereon the well-known printing 23 found on the faces of business reply envelopes, to which no postage need be applied, this printing being shown in full in Fig. 6.

In the formation of the completed envelope structure of Fig. 5, in readiness for incorporation in the pamphlet, the flaps 13 and 14 are folded over against the upper side of the portion 11 along the lines 15 and 16, and the front wall portion 17 is then folded over against the face of the portion 11 and secured to the flaps 13 and 14 by suitable adhesive. The flap 19 is then folded back along the line 21 into the position in Figs. 2 and 5. When this structure is positioned within a pamphlet, the printing 22 appears on the envelope when the pamphlet is open as in Fig. 1, said printing being readily readable since it preferably extends at right angles to the binding of the magazine. Printing 22' which may be placed on the sealing flap, appears when the envelope structure is turned to the position of Fig. 2.

One edge of the blank may have a locating or trimming tab 24, preferably integral with and extending from the strip 6, which projects beyond the side edge of the completed envelope structure (Fig. 5) to position the latter far enough away from the uncut edges of the pamphlet, so that when the edges are trimmed, the entire envelope structure will be located within the outer edges of said pamphlet.

In assembling the pamphlet and the envelope structure of Fig. 5, the several sheets 2 of the pamphlet are positioned in stacked relation, preferably over a wedge-shaped member, and the envelope structure is positioned between the other pamphlet sheets with the folded edge 7 coinciding with the folds in the other sheets. The sheets are then all clipped together by the well known clips 3 which hold the envelope structure therein. In locating the several sheets of the pamphlet against a stop which engages the end edges of the sheets, it will be apparent that the edge of the tab 24 also engages said stop and causes the envelope structure to be properly located within the edges of the pamphlet.

In use, the complete envelope is removed from the strip 6 by tearing along the line of perforations 12, (Fig. 6), and such enclosures as are desired are then positioned within the completed envelope, after which the latter is sealed by folding the sealing flap over from its position in Figs. 1 and 2 to overlie the back wall portion 11 to which the flap is secured by the adhesive thereon. The flap 8 may also be removed from the envelope structure by tearing along the line 9 if it is desired to use this flap as an enclosure, as for example, when said flap has thereon places for ordering subscriptions for the periodical in which the structure is mounted.

It will be noted that the envelope in the magazine as it is sold to the purchaser is a complete envelope which is ready for use and which may be closed and sealed for mailing as first-class mail matter merely by the removal of the envelope from the strip 6 and by folding over and securing of the sealing flap to the rear wall.

Moreover, since the envelope is separable from the strip by which the envelope is secured to the pamphlet, the removal of the envelope does not in any way mutilate the pamphlet, nor is there any possibility of mutilating the envelope during its removal. The strip 6 constitutes an easy and satisfactory means for attaching the envelope to the pamphlet, or, in certain cases, for attaching both an envelope and enclosure for the envelope in the pamphlet.

Referring now to Fig. 7, there is shown a modified form of blank for the envelope structure, which is similar to the blank of Fig. 4 in that it provides a rear wall portion 11', with side flaps 13' and 14', front wall portion 17' and a sealing flap 19' with adhesive 20' applied thereto. A complete envelope is formed from the blank by folding the flaps 13', 14' and 17' along the lines 15', 16' and 18', with the flaps united by adhesive. The blank also provides a relatively narrow strip 6' extending along one edge of the rear wall portion 11' with a fold line 7' extending close to a row of perforations 12' between the strip 6' and wall portion 11'. If desired, the row of perforations 12' may coincide with the fold line 7'.

In mounting the envelope structure of Fig. 8 within the pamphlet, the fold line 7' coincides with the lines of fold in the other sheets of the pamphlet through which the fasteners pass. Consequently, the major portion of the strip 6', with its locating tab 24', extends on the opposite side of the fold line of the pamphlet to properly locate the envelope structure, the strip 6' thus performing the same function as the combined strip and enclosure flap of Fig. 5. In use, the complete envelope is separated from the strip 6' by tearing along the perforations 12', the envelope when removed from the pamphlet appearing substantially as shown in Fig. 6. When either the sealing flap 19 or 19' is turned down to close an envelope, the ragged edge resulting from the tearing of the perforations 12 or 12' is concealed.

In the modification shown in Figs. 9 and 10, the blank for the envelope structure is similar to the blanks previously described, in that it provides front and rear wall portions 26 and 25, and side flaps 28 and 29 foldable along the lines 27, 30 and 31 respectively, to form a complete envelope, as shown in Fig. 10. The blank also provides a sealing flap 32 having adhesive 33 applied only along one edge thereof, and a binding flap 34 having adhesive 35 applied to its entire area. The flap 34 has a line of perforations 36, and in mounting the envelope structure within the pamphlet, the perforations 36 serve as a fold line coinciding with the lines of fold in the other sheets of the pamphlet through which the fasteners pass. In use, the completed envelope is separated from the binding flap 34 by tearing along the perforations 36 and the envelope thus removed provides an auxiliary gummed flap 37 foldable along the line 38 into adhesive engagement with the sealing flap 32 to close the mouth of the envelope pocket. The sealing of the flap 37 followed by folding over the sealing flap 32 along the line 32a and sealing it by the adhesive 33, provides a double adhesive closure for the envelope.

If desired, the line of perforations 36 may coincide with the fold line 38, in which case there would be no preliminary adhesive attachment of an auxiliary flap on the wall 25 to the seal flap 32, as described above. An envelope structure of this character can be secured within the pamphlet by the adhesive between the perforations 36 and the edge of the binding flap 34, the complete envelope then being removable from the pamphlet by tearing along the perforations 36.

Figure 12:
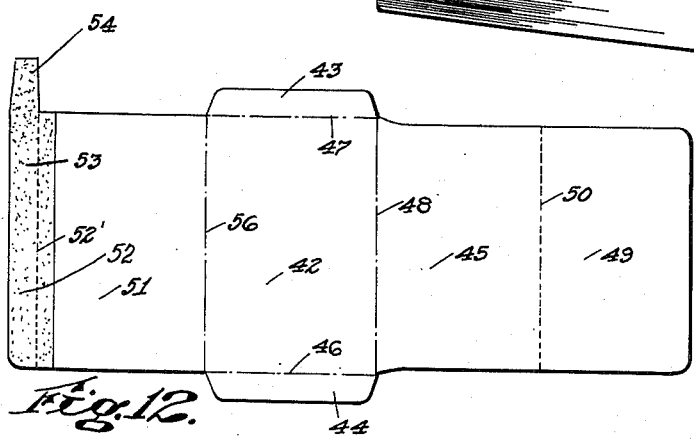
Fig. 12 is a plan view of the blank from which the envelope structure of Fig. 11 is formed.
Figure 13:
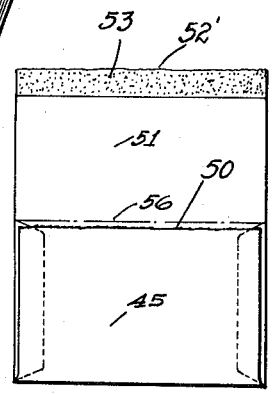
Fig. 13 is a plan view of the complete envelope of Fig. 11, as removed from the pamphlet, with its enclosure flap torn off.

Referring now to Figs. 11 to 13 inclusive, a flat type of pamphlet 39 is shown as being made up of a plurality of sets of folded sheets arranged in stacked relation and held together by clips 40 passing through all of the sheets. In this type of pamphlet 39, the envelope structure 41 is held in position by the clips 40 in such a manner that any printing on the complete envelope, or on an enclosure sheet integral therewith, can be read while the pamphlet is held in its open position. At the same time, as will hereinafter appear, the complete envelope is separable from the pamphlet without mutilating either the pamphlet or envelope.

As best shown in Fig. 12, the blank for the envelope structure provides a front wall portion 42, with side flaps 43 and 44, and a rear wall portion 45, these portions being foldable along the lines 46, 47 and 48 to form a complete envelope. A flap 49 extends from one edge of the rear wall portion 45, and is adapted to be separated therefrom along a line of perforations 50, so that the flap 49 can be used as an enclosure sheet for the complete envelope. A sealing flap 51 extends from one edge of the front wall portion 42, the area of the flap 51 being greater than the envelope body to provide a binding strip 52 separable from the flap 51 by perforations 52'. Adhesive 53 is applied along the outer edge of the sealing flap 51, and although the adhesive is shown as extending over the strip 52, this is merely incidental to the application of adhesive along the edge of the sealing flap proper. The flap 51 also provides a locating tab 54 extending from the binding strip 52 and integral therewith, the tab 54 remaining in the pamphlet when the envelope is removed by tearing along perforations 52'.

After the folding of the blank to complete the envelope as shown in Fig. 11, the envelope structure is positioned within the pamphlet with the aid of the tab 54, so that the clips 40 pass through the strip 52. With the envelope structure thus bound in place, the enclosure flap 49 overlies the sealing flap 51, thus providing a relatively large continuous surface for printed matter 57. Obviously, such printed matter 57 appearing on the rear wall 45 and flap 49 is applied to the underside of the blank of Fig. 12, at which time, if desired, the front wall portion 42 may also have printed thereon the usual matter not shown, found on business reply envelopes for which a postage stamp is unnecessary, see Fig. 6. In use, the completed envelope is removed from the pamphlet by tearing along the line of perforations 52', after which the enclosure flap 49 may be removed by tearing along the perforations 50 for insertion in the envelope, see Fig. 13. The envelope is then sealed by folding the flap 51 along the line 56 and securing the same to the rear wall 45 of the envelope by the adhesive 53.

Where the clips 40 of the pamphlet are not properly located for holding the envelope structure, the structure may be secured in position by the adhesive between the line of perforations 52' and the outer edge of the binding strip 52. In that case, the envelope is readily removable by tearing along the perforations 52', as before.

Figures 14, 15:
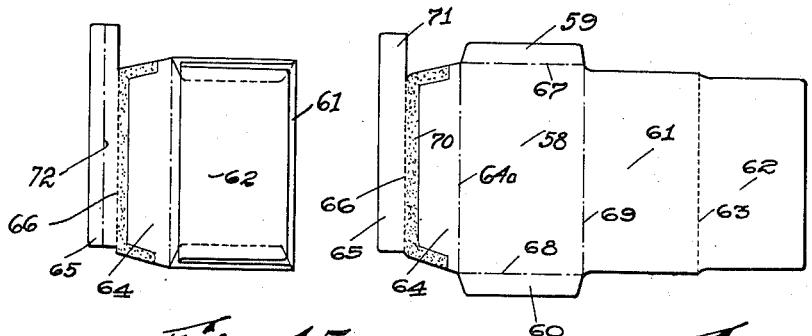
Fig. 14 is a plan view of a modified form of blank from which is formed an envelope structure adapted to either the saddle-back or flat type of pamphlet.
Fig. 15 is a plan view of a complete envelope formed from the blank of Fig. 14, in readiness for insertion in a pamphlet.

The envelope structure shown in Figs. 14 and 15, while similar to the structure described with reference to Figs. 11 to 13 inclusive, differs therefrom in that it is adapted for incorporation in either a saddle-back or flat type of pamphlet. The blank of Fig. 14 provides a front wall portion 58 having side flaps 59 and 60 and a rear wall portion 61. The blank further provides an enclosure flap 62 separable from the rear wall portion 61 by perforations 63 and a sealing flap 64 providing a binding strip 65 separable from the flap proper by perforations 66.

In forming a complete envelope from the blank, the flaps 59, 60 and 61 are folded along the lines 67, 68 and 69 respectively, and it is to be noted that the enclosure flap 62 is folded along the perforations 63 to bring the flap 62 in overlying relation to the rear envelope wall, as shown in Fig. 15. The seal flap 64 is provided along its edges with adhesive 70 extending only to the perforations 66, and the strip 65 beyond the perforations 66 provides a suitable locating tab 71. The envelope structure shown in Fig. 15 is applicable to either a saddle-back or flat type of pamphlet, since the strip 65 is wide enough to provide a fold line 72, which coincides with the folded lines of the sheets of the pamphlet when the envelope structure is secured by clips in the manner shown in Fig. 3. When incorporating the envelope structure of Fig. 15 in a flat type of pamphlet, the strip 65 is secured by the clips 40 in the same manner as the strip 52 is secured, as shown in Fig. 11. When bound in either type of pamphlet, the complete envelope can be removed by tearing along the perforations 66 without mutilating either pamphlet or envelope, after which the flap 62 is removed for insertion in the envelope and closure of the same is effected by the sealing flap 64.

From the foregoing, it is apparent that by the present invention there is provided a pamphlet, magazine or other printed matter, one sheet of which provides a complete envelope initially forming a portion of the pamphlet, but readily removable therefrom, without mutilating either the pamphlet or the envelope. Furthermore, the envelope structure is so bound in the pamphlet that portions of the complete envelope, as well as an associated enclosure flap, may be provided with printed matter that is readable upon opening the pamphlet in the usual manner.

I claim:

1. As a new article of manufacture, a complete envelope having a separable integral strip extending from one edge thereof, said strip extending beyond one of the edges of the envelope adjacent to the edge from which the strip extends for locating said envelope within a pamphlet.

2. As a new article of manufacture, a complete envelope having a strip integral therewith and extending from one edge thereof, said strip having a projecting tab of a sufficient length to extend beyond one of the edges of the envelope adjacent to the edge from which the strip extends.

3. The combination with a pamphlet comprising a plurality of sheets and means for holding said sheets together, of a completed envelope secured within said pamphlet, the latter having an integral strip engaged by said means, and a tab projecting beyond one of the edges of said envelope adjacent to the portion of the envelope from which the strip extends to aid in positioning said envelope properly within the edges of the pamphlet.

4. As a new article of manufacture, an envelope structure for mounting in a pamphlet with the envelope removable therefrom, such structure comprising a completed envelope including a sealing flap and an integral strip extending from a part of said envelope, said strip being separable from said envelope and projecting at one end thereof beyond the edge portions of the envelope adjacent to the part of the envelope from which said strip extends.

5. As a new article of manufacture, an envelope structure adapted for mounting in a periodical with a completed envelope removable from the remainder of the structure, said structure comprising a completed envelope including a sealing flap, and an integral strip extending from a part of said completed envelope and separable therefrom, said strip providing for attachment of the envelope structure to the periodical by the same securing means that hold the sheets of the periodical together, one end of said strip extending beyond the edge portions of the envelope adjacent to the part from which the strip extends.

CHARLES W. TOWNSEND.